(12) United States Patent
Ramasamy et al.

(10) Patent No.: US 9,661,531 B2
(45) Date of Patent: May 23, 2017

(54) METHOD AND APPARATUS FOR CELL RESELECTION

(71) Applicant: Apple Inc., Cupertino, CA (US)

(72) Inventors: Venkatasubramanian Ramasamy, San Jose, CA (US); Giri Prassad Deivasigamani, San Jose, CA (US); Srinivasan Vasudevan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/486,892

(22) Filed: Sep. 15, 2014

(65) Prior Publication Data

US 2015/0105078 A1 Apr. 16, 2015

Related U.S. Application Data

(63) Continuation of application No. 12/769,473, filed on Apr. 28, 2010, now Pat. No. 8,838,106.
(Continued)

(51) Int. Cl.
*H04W 36/00* (2009.01)
*H04W 48/20* (2009.01)

(52) U.S. Cl.
CPC ....... *H04W 36/0061* (2013.01); *H04W 48/20* (2013.01)

(58) Field of Classification Search
CPC ..... H04W 36/08; H04W 36/24; H04W 48/18; H04W 36/0016; H04W 36/34;
(Continued)

(56) References Cited

U.S. PATENT DOCUMENTS 5,379,447 A 1/1995 Bonta et al.
5,768,267 A 6/1998 Raith et al.
(Continued)

FOREIGN PATENT DOCUMENTS

EP 1916865 A2 4/2008
JP 07307971 A 11/1995
(Continued)

OTHER PUBLICATIONS

Extended European Search Report and Search Opinion dated May 2, 2011 from European Application No. 11155517.3.
(Continued)

*Primary Examiner* — Timothy Pham
(74) *Attorney, Agent, or Firm* — Downey Brand LLP

(57) ABSTRACT

A method of reselecting a mobile wireless communication device to a network subsystem before initiating a connection with a wireless communication network. A connection request is received by the mobile wireless communication device in response to a user input. Attributes of signals received by the mobile wireless communication device from multiple network subsystems in the wireless communication network are measured over a period of time. The mobile wireless communication device is associated with one of the network subsystems and not associated with other network subsystems. The mobile wireless communication device reselects to one of the network subsystems based on quality metrics generated from the measured received signal attributes. After reselection, the mobile wireless communication device initiates a connection through the reselected network subsystem.

26 Claims, 7 Drawing Sheets

Related U.S. Application Data

(60) Provisional application No. 61/307,373, filed on Feb. 23, 2010.

(58) Field of Classification Search
CPC . H04W 36/10; H04W 36/0061; H04W 48/20;
C03C 10/0036
USPC ........................................................ 455/436
See application file for complete search history.

(56) References Cited

U.S. PATENT DOCUMENTS

| | | | |
|---|---|---|---|
| 5,974,320 | A | 10/1999 | Ward et al. |
| 6,259,915 | B1 | 7/2001 | Raith |
| 6,510,146 | B1 | 1/2003 | Korpela et al. |
| 7,616,933 | B2 | 11/2009 | Moore |
| 2003/0040311 | A1 | 2/2003 | Choi |
| 2004/0192296 | A1 | 9/2004 | Ohmori |
| 2006/0084443 | A1 | 4/2006 | Yeo et al. |
| 2007/0173255 | A1* | 7/2007 | Tebbit .................. H04W 36/30 455/434 |
| 2007/0259699 | A1 | 11/2007 | Homchaudhuri |
| 2007/0275717 | A1 | 11/2007 | Edge et al. |
| 2007/0298796 | A1 | 12/2007 | Moon et al. |
| 2008/0039094 | A1 | 2/2008 | Jeong et al. |
| 2008/0108346 | A1 | 5/2008 | Umatt et al. |
| 2008/0167044 | A1 | 7/2008 | Natsume |
| 2009/0047954 | A1 | 2/2009 | Tenny et al. |
| 2009/0075690 | A1 | 3/2009 | Roberts et al. |
| 2009/0135784 | A1 | 5/2009 | Horn et al. |
| 2009/0154416 | A1 | 6/2009 | Lu et al. |
| 2009/0170510 | A1 | 7/2009 | Kim |
| 2009/0175183 | A1 | 7/2009 | Mochizuki et al. |
| 2009/0190500 | A1 | 7/2009 | Ji et al. |
| 2009/0239535 | A1* | 9/2009 | Chun .................. H04J 11/0069 455/435.2 |
| 2010/0014454 | A1 | 1/2010 | Reddy et al. |
| 2010/0035610 | A1 | 2/2010 | Narang et al. |
| 2010/0130215 | A1 | 5/2010 | Jung et al. |
| 2010/0290389 | A1 | 11/2010 | Hou et al. |
| 2010/0311421 | A1* | 12/2010 | Mach .................. H04W 48/16 455/436 |
| 2010/0323663 | A1* | 12/2010 | Vikberg ............... H04J 11/0093 455/410 |
| 2011/0269449 | A1 | 11/2011 | Kazmi et al. |

FOREIGN PATENT DOCUMENTS

| | | |
|---|---|---|
| JP | H1175237 A | 3/1999 |
| JP | H11075237 A | 3/1999 |
| JP | H11136738 A | 5/1999 |
| JP | H11308663 A | 11/1999 |
| JP | 2001095028 A | 4/2001 |
| JP | 2002044700 A | 2/2002 |
| JP | 2004187104 A | 7/2004 |
| KR | 10-2001-0052421 | 6/2001 |
| KR | 10-2005-0017514 | 2/2005 |
| KR | 10-2006-0027761 A | 3/2006 |
| KR | 10-2008-0068993 | 7/2008 |
| WO | 9901005 A1 | 1/1999 |
| WO | 99-63771 | 12/1999 |
| WO | WO2008038336 A1 | 4/2008 |
| WO | WO2009045968 A1 | 4/2009 |

OTHER PUBLICATIONS

Korean Office Action for KR 10-2011-16214 dated Apr. 26, 2012.
Russian Office Action for RU 2011106370/07 dated Apr. 25, 2012.
Final Rejection in Japanese Application No. 2011-009160 dated May 27, 2013.
First Office Action in Japanese Application No. 2011-009160 dated Sep. 24, 2012.
KIPO's Notice of second Final Rejection (Translation) in Korean Application No. 10-2011 16214 dated Dec. 26, 2012.
Resolution on granting patent for invention in Russian Application No. 2011106370/07 (009038), Aug. 1, 2013.
"Complexity analysis for parallel GSM synchronisation", Siemens, 3GPP TSG-RAN Working Group 1 (Radio) Meeting #6, TSGR1#6(99)873, Espoo, Finland, Jul. 13-16, 1999, chapters 3-5, 4 pages.
Japanese Patent Application No. 2013-200480—Office Action dated Jun. 30, 2014.
Korean Office Action; KR Patent Application No. 10-2013-0090031 dated May 16, 2016.
Japanese Patent Application No. 2015-166133—Office Action dated Aug. 8, 2016.

* cited by examiner

METHOD AND APPARATUS FOR CELL RESELECTION

CROSS REFERENCE TO RELATED APPLICATIONS

This patent application is a continuation of U.S. application Ser. No. 12/769,473, filed Apr. 28, 2010, entitled "METHOD AND APPARATUS FOR CELL RESELECTION", which claims the benefit of U.S. Provisional Application No. 61/307,373, filed Feb. 23, 2010, entitled "CELL RE-SELECTION CALL ORIGINATION", which are herein incorporated by reference in their entirety.

FIELD

The described embodiments relate generally to wireless mobile communications. More particularly, a method is described for performing cell reselection prior to call origination by a mobile wireless communication device.

BACKGROUND

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a base transceiver station (BTS). Whether idle or actively connected, a mobile wireless communication device can be associated with a "serving" cell in a wireless communication network and be aware of neighbor cells to which the mobile wireless communication device can also associate. The quality of a communication link between the mobile wireless communication device and the BTS can vary based on the distance between them and on interference included in received signals at either end of the communication link. As the mobile wireless communication device moves further away from the BTS, eventually a neighbor cell can provide an equal or better performing communication link than the current serving cell. The mobile wireless communication device can include a process for determining if and when to switch cells with which it associates. If the mobile wireless communication device is actively connected to the serving cell, then the process of switching to a neighbor cell is known as "handoff." For a mobile wireless communication device that is associated with a serving cell in an "idle" state, the process of associating with a neighbor cell is known as "cell reselection."

When a mobile wireless communication device seeks to associate with a wireless communication network, such as after a power on initialization, the mobile wireless communication device can search for cells located in its vicinity. If a cell is located that has sufficient performance quality to provide a wireless communication link, then the mobile wireless communication device can associate with that cell. The mobile wireless communication device can then be "camped" on a particular "serving" cell in the wireless communication network of cells. While camped on the serving cell, the mobile wireless communication device can listen to messages broadcast from the serving cell BTS as well as from other BTS located in neighbor cells. If the mobile wireless communication device determines that a neighbor cell can provide a higher quality communication link than a current serving cell, then the mobile wireless communication device can disassociate from the current serving cell and associate with the neighbor cell, in a process known as "cell reselection," typically after waiting for a certain time period. By waiting before performing cell reselection, the mobile wireless communication device can avoid bouncing between different cells as the quality of the communication links between the mobile wireless communication device and several nearby cells changes.

Waiting a fixed period of time before cell reselection, however, can result in a mobile wireless communication device continuing to associate with a serving cell to which the performance of a connection is degrading when the mobile wireless communication device seeks to originate an active connection. An active connection between the "idle" mobile wireless communication device and the BTS in the current serving cell can be initiated by the mobile wireless communication device or by the BTS through an exchange of a series of messages. While camped on a serving cell, a wireless mobile communication device can initiate a connection with the serving cell with which it is associated, but not with a neighbor cell, even if the performance of a connection between the mobile wireless communication device and the neighbor cell can result in a higher quality connection. The performance of a connection between the mobile wireless communication device and the serving cell can degrade sufficiently rapidly that the mobile wireless communication device cannot handoff to a neighbor cell before the connection drops.

Thus there exists a need to evaluate a quality of a link between a serving cell and a mobile wireless communication device and to reselect to a better quality cell if available prior to call origination by the mobile wireless communication device. Monitoring the quality of multiple neighbor cells in addition to the serving cell can improve a success rate of call origination.

SUMMARY

This paper describes various embodiments that relate to methods to associate a mobile wireless communication device with network subsystems before initiating a connection of the mobile wireless communication device with a wireless communication network.

In one embodiment, a method is described. The method can be performed at a mobile wireless communication device. In the described embodiment, when the mobile wireless communication device is powered and not connected to a wireless network the mobile wireless communication device can evaluate wireless signal attributes of wireless signals received from a plurality of wireless network subsystems and identify one of the plurality of wireless network subsystems based on the evaluating until a network connection request is generated by the mobile wireless communication device. In response to the connection request, the mobile communication device can associate with the identified wireless network subsystem and initiate the connection to the wireless network using the identified wireless network subsystem.

In another embodiment, a method can be performed by a mobile wireless communication device. The mobile wireless communication device can generate a request to connect to a wireless network. In response to the request, the mobile wireless communication device can receive a wireless signal having one or more wireless signal attributes from a plurality of network subsystems, measure the at least one or more wireless signal attributes, compare the measured one or more signal attributes with each other, identify one of the plurality of network subsystems based on the comparing, and use the identified one of the plurality of network subsystems to connect to the wireless network.

A mobile wireless communication device is described that includes at least a wireless transceiver and a processor. In the described embodiment, the wireless transceiver is arranged to receive a wireless signal from a plurality of wireless network subsystems, the wireless signals having one or more signal attributes that includes at least a wireless signal strength and a wireless signal quality. The processor is arranged to execute instructions for measuring the one or more signal attributes of the wireless signal received by the mobile wireless communication device, compare the measured one or more signal attributes with each other, associating the mobile wireless communication device with one of the plurality of network subsystems based on the comparing, and initiating a connection between the mobile wireless communication device and the associated one of the plurality of network subsystems.

A method of reselecting a mobile wireless communication device between network subsystems before initiating a connection with a wireless communication network is described. The method can be performed by receiving a request to connect to the wireless communication network by the mobile wireless communication device, measuring one or more attributes of signals received by the mobile wireless communication device from a first network subsystem associated with the mobile wireless communication device and from a second network subsystem in the wireless communication network not associated with the mobile wireless communication device, reselecting the mobile wireless communication device to the first or second network subsystem based on the measured attributes of signals, and initiating the connection of the mobile wireless communication device with the wireless communication network through the reselected network subsystem.

Computer program product encoded in a tangible computer readable medium for associating a mobile wireless communication device with a wireless network substation of a wireless network based upon measured signal attributes of a wireless signal received at the mobile wireless communication device prior to the mobile wireless communication device joining the wireless network is described. The computer program product includes at least computer code for receiving the wireless signal at the mobile wireless communication device from a plurality of network subsystems of the wireless network, the wireless signal having one or more wireless signal attributes, computer code for measuring the at least one or more wireless signal attributes, computer code for comparing the measured one or more signal attributes with each other, computer code for identifying one of the plurality of network subsystems.

A mobile wireless communication device is described that includes at least a processor. When the mobile wireless communication device is not connected to a wireless network, the processor evaluates wireless signal attributes of wireless signals received from a plurality of wireless network subsystems, identifies the mobile wireless communication device with one of the plurality of wireless network subsystems based on the evaluating, repeats the evaluating and associating until a network connection request is generated by the mobile wireless communication device, and in response to the connection request, initiates the connection to the wireless network using the identified one of the plurality of wireless network subsystems.

BRIEF DESCRIPTION OF THE DRAWINGS

The invention and the advantages thereof may best be understood by reference to the following description taken in conjunction with the accompanying drawings.

DETAILED DESCRIPTION

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
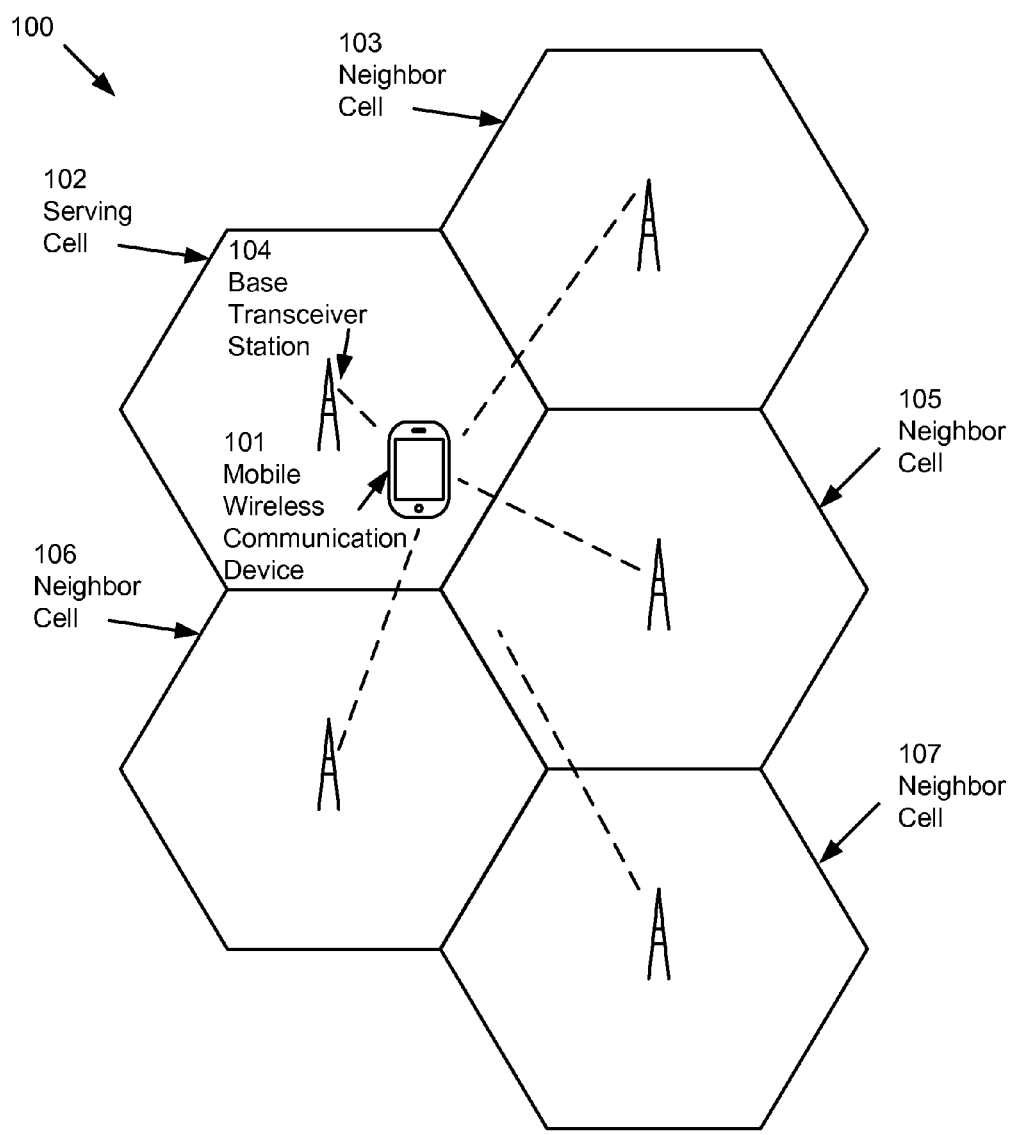
FIG. 1 illustrates a mobile wireless communication device located within a wireless cellular communication network.

A mobile wireless communication device 101 can include the capability to connect seamlessly with a wireless communication network 100 of overlapping wireless communication cells, each wireless communication cell covering a geographic area extending from a base transceiver station (BTS) as illustrated in FIG. 1. The mobile wireless communication device 101 can receive communication signals from a number of different cells in the wireless communication network 100, each cell located at a different distance from the mobile wireless communication device. As signal strength of a wireless communication signal decays proportionally to the square of the distance between a transmitting end and a receiving end, the mobile wireless communication device 101 can monitor the received signal strength from several different cells in the wireless communication network 100 to determine a cell having the strongest received signal at any given time. As the mobile wireless communication device 101 changes locations within a wireless communication network 100, the received signal strength can vary substantially, and thus the cell from which the mobile wireless communication device 101 receives the strongest signal can change. The mobile wireless communication device 101 can maintain a dynamic table of cells from which it can receive signals and a corresponding measure of signal strength received from each.

After a "power on" initialization, or similarly when entering a "new" wireless communication network, the mobile wireless communication device 101 can seek to associate with a cell in the wireless communication network 100. A BTS in each cell of the wireless communication network 100 can broadcast a set of messages at regular intervals that identify salient characteristics of the BTS. Based on measurements of received signal strength, or other quality metrics such as carrier to interference ratios, the mobile wireless communication device 101 can associate with a base transceiver station 104, thereby choosing a particular cell within the wireless communication network 100 as a "serving" cell 102. The process of associating with a cell can be also known as "camping" on that cell. After associating with the serving cell 102, the mobile wireless communication device can initiate connections (such as voice or data calls) with the serving cell 102. The base transceiver station 104 in the serving cell 102 can also initiate connections to the mobile wireless communication device 101, as the wireless network 100 can be aware of the association between the serving cell 102 and the mobile wireless communication device 101. While "camped" on the serving cell 102, the mobile wireless communication device 101 can continue to monitor broadcast signals from neighbor cells, each signal possibly traversing a different distance between its associated BTS and the mobile wireless communication device 101. As shown in FIG. 1, the mobile wireless communication device 101 can receive detectable signals from neighbor cells 103 A, B and C, while neighbor cell D 103 can be located at too great a distance for any broadcast signals to be received reliably. In addition to distance, which attenuates signal strength, interference received at a mobile wireless communication device 101 can also affect the quality of reception and detection of signals from different cells within the wireless network 100.

Figure 2:
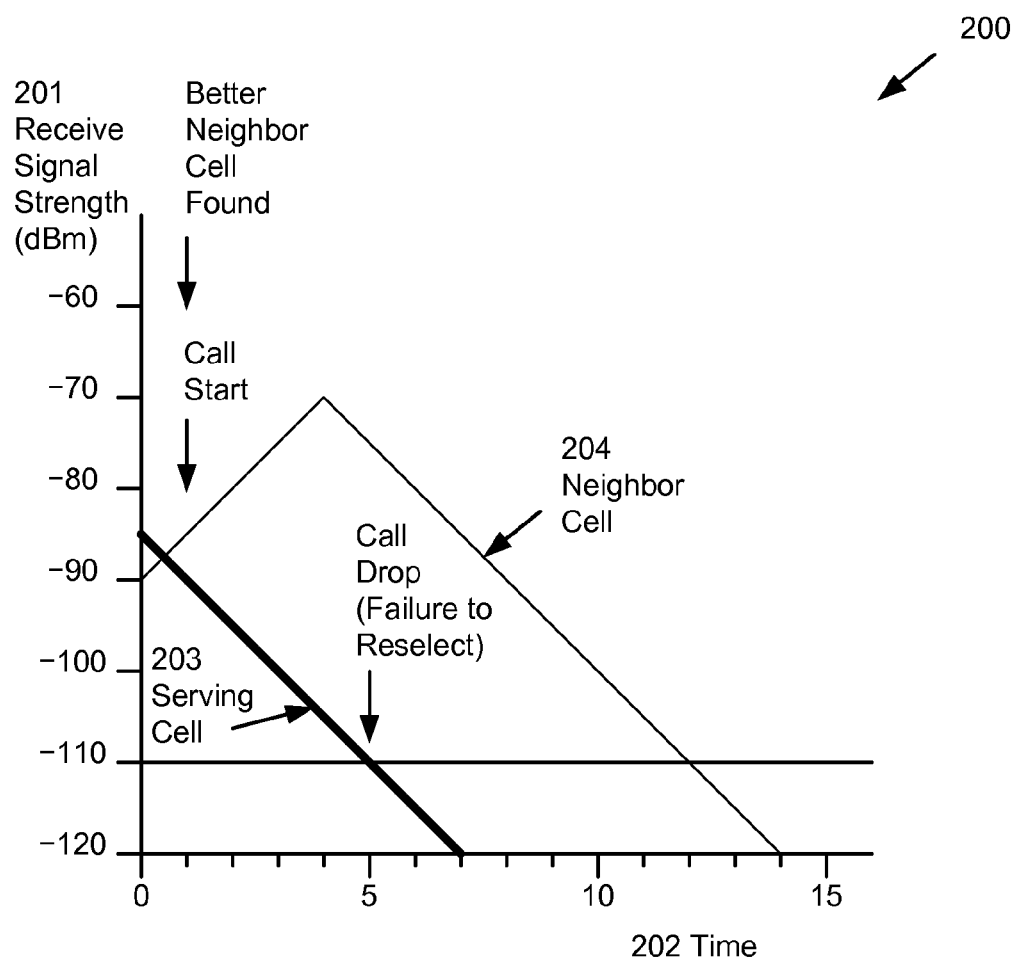
FIG. 2 illustrates varying received signal strengths for a mobile wireless communication device traversing several cells in a wireless cellular communication network.

FIG. 2 illustrates a graph 200 of receive signal strength 201 for a mobile wireless communication device 101 traversing through several overlapping cells of a wireless network. Initially at time 0, the mobile wireless communication device 101 can receive stronger signals from a BTS within a serving cell 203 than from a BTS in a neighbor cell 204. The distance between the mobile wireless communication device 101 and the BTS in the serving cell 203 can increase as time advances resulting in declining received signal strength, while simultaneously the distance to the BTS in the neighbor cell 204 can decrease resulting in rising received signal strength. The mobile wireless communication device 101 can regularly monitor received signal strength 201 from BTS located in several different cells to determine from which cell the strongest signal is received. If signals from a neighbor cell exceed those from the serving cell for a period of time, then the mobile wireless communication device 101 can choose to "reselect" from the current serving cell to a neighbor cell. In GSM (Global System for Mobile Communication) systems, a delay time for reselection can be set to wait at least five seconds before switching from a current serving cell to a new neighbor cell.

As shown in FIG. 2, the signal strength from neighbor cell 204 can exceed the signal strength from the serving cell 203 at a time 202 between 0 and 1. Accounting for some processing time for detection of the change in signal strength, the mobile wireless communication device 101 can detect that the neighbor cell is better than the serving cell 203 by a time value of 1. At the same time value of 1, the mobile wireless communication device 101 can also choose to initiate a connection. As the mobile wireless communication device 101 is associated with serving cell 203, a connection with the network can first be realized by communicating through the BTS of the serving cell 203. Although the receive signal strength 201 from the serving cell 203 can be lower than the signal strength received from the neighbor cell 204, the mobile wireless communication device 101 cannot choose to connect with the neighbor cell until after reselection completes. Once a connection between the mobile wireless communication device 101 and the serving cell 203 has begun, the mobile wireless communication device 101 can transfer the connection to the neighbor cell 204 through a process known as "handoff" under control of the wireless network. The "handoff" process can take a substantial length of time to complete because the mobile wireless communication device 101 can be required to measure received signal performance and communicate these measurements to the wireless network before the wireless network can decide when handoff can occur.

In some situations, the signal strength of the connection between the mobile wireless communication device 101 and the BTS in the serving cell 203 can be sufficiently weak that the handoff from the serving cell 203 to the neighbor cell 204 cannot be realized. In this case, as shown in FIG. 2, the connection between the mobile wireless communication device 101 and the wireless network can terminate (call drop) when the receive signal strength 201 falls below a certain threshold (for example −110 dBm). Thus, while the mobile wireless communication device 101 can know that a better neighbor cell exists before starting a call, a connection with the neighbor cell cannot be realized when a call origination with the network precedes a neighbor cell reselection. Connections between the mobile wireless communication device 101 and the wireless network can drop because the connection never completes or because a completed connection with a serving cell is too weak to communicate messages to switch to a better neighbor cell.

Current methods can use received signal strength as a measure of quality for determining reselection; however, better and faster methods can also use other quality metrics. The quality of a connection between a mobile wireless communication device and a BTS can combine multiple measurements at the mobile wireless communication device based on signals broadcast from the BTS. One such measurement can include the receive signal strength 201 as indicated in FIG. 2 for the current serving cell 203 and for one or more neighbor cells, such as neighbor cell 204. (Although not shown in FIG. 2, multiple neighbor cells can be available as shown in FIG. 1, and the receive signal strength 201 from each neighbor cell can be monitored.) In addition to an instantaneous or average receive signal strength, the mobile wireless communication device 101 can also monitor changes in receive signal strength for each cell, such as the slopes of the receive signal strength lines shown in FIG. 2. Thus a mobile wireless communication device can estimate not only the current quality of cells but can also predict the future quality of connections to each cell.

Figure 3:
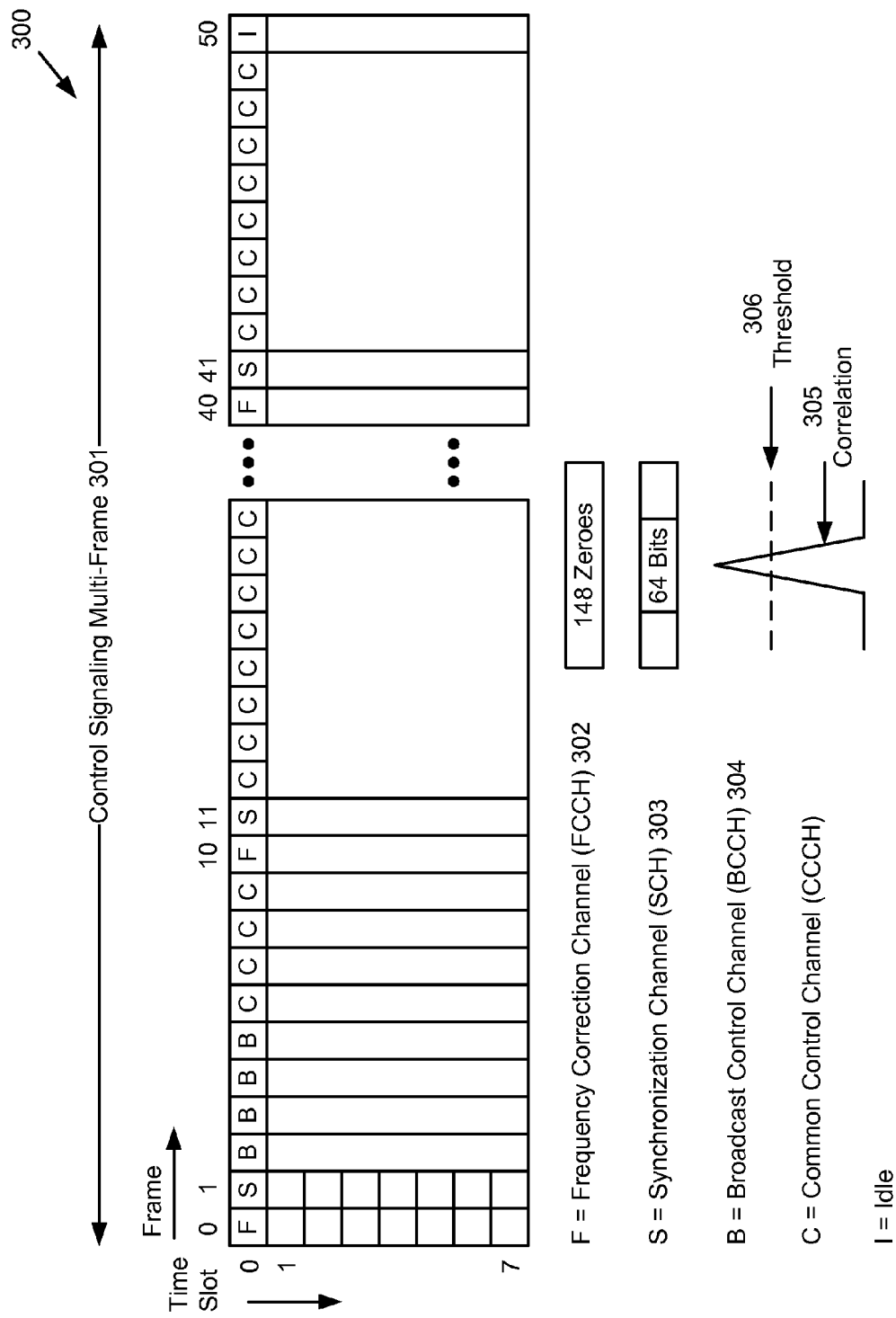
FIG. 3 illustrates a control signaling multi-frame structure for a wireless communication network.

Besides receive signal strength, the mobile wireless communication device 101 can determine and track other quality metrics that can account for received interference as well as received signal. These quality metrics can include correlations of received signals with known data patterns, estimates of signal to noise ratios based on equalizer outputs, and indications of errors from decoding units within the receiver of the mobile wireless communication device 101. As shown in FIG. 3, in some embodiments, a BTS can broadcast control signaling information repeatedly at regular intervals. A control signaling multi-frame 301 can include several different channels transmitted on a fixed time slot 0, and each frame in the multi-frame 301 can contain information for a different control channel. For a GSM wireless communication network, a BTS can broadcast a frequency correction channel (FCCH) 302 and a synchronization channel (SCH) 303 once every 10 frames in a 51 frame multi-frame 301. The FCCH 302 can consist of a burst of 148 consecutive zeroes that can generate a signal at a fixed frequency. While the mobile wireless communication device 101 can use the received fixed frequency signal from the FCCH 302 to align its local oscillator to the BTS transmitter, it can also use the FCCH 302 to measure a quality of the communication path between the BTS and itself. In an embodiment, the mobile wireless communication device 101 can correlate bursts received on the FCCH 302 in frames 0, 10, 20, etc. with a fixed pattern of zeroes to determine effectively signal strength in the presence of interference. The correlation 305 can be compared against a fixed or adaptive threshold 306 to assess the quality of the connection between the BTS and the mobile wireless communication device 101. Similarly the SCH 303 can include a fixed, known pattern of 64 bits that can be correlated with received signals received in frames 1, 11, 21, etc. to also determine a quality of the connection between the mobile wireless communication device 101 and the BTS. Thresholds used for the correlation of the FCCH 302 and the SCH 303 can be independent.

The mobile wireless communication device 101 can also monitor a decode success rate for bursts received on the broadcast control channel (BCCH) 304, on the FCCH 302 and on the SCH 303. In a representative embodiment, the mobile wireless communication device 101 can maintain a database of quality for the serving cell and for one or more neighbor cells ranking each cell's performance using quality metrics as described above. The mobile wireless communication device can monitor the BCCH 304 in the serving cell and the FCCH 302 and the SCH 303 in known neighbor cells. (For GSM networks, the serving cell can broadcast on the BCCH a list of neighbor cells.) A neighbor cell can be considered a candidate for reselection if a minimum threshold is met for one or more of the monitored quality metrics. For example, a threshold can be set for the decode success of the FCCH and SCH that indicates that minimal or no decoding errors are expected for communication with a reselected neighbor cell. The mobile wireless communication device 101 can include a battery, and to minimize power consumption by the battery, the mobile wireless communication device can reduce computational cycles by limiting the monitoring and ranking of connection quality to periods when the serving cell's performance is degrading rather than all of the time.

Figure 4:
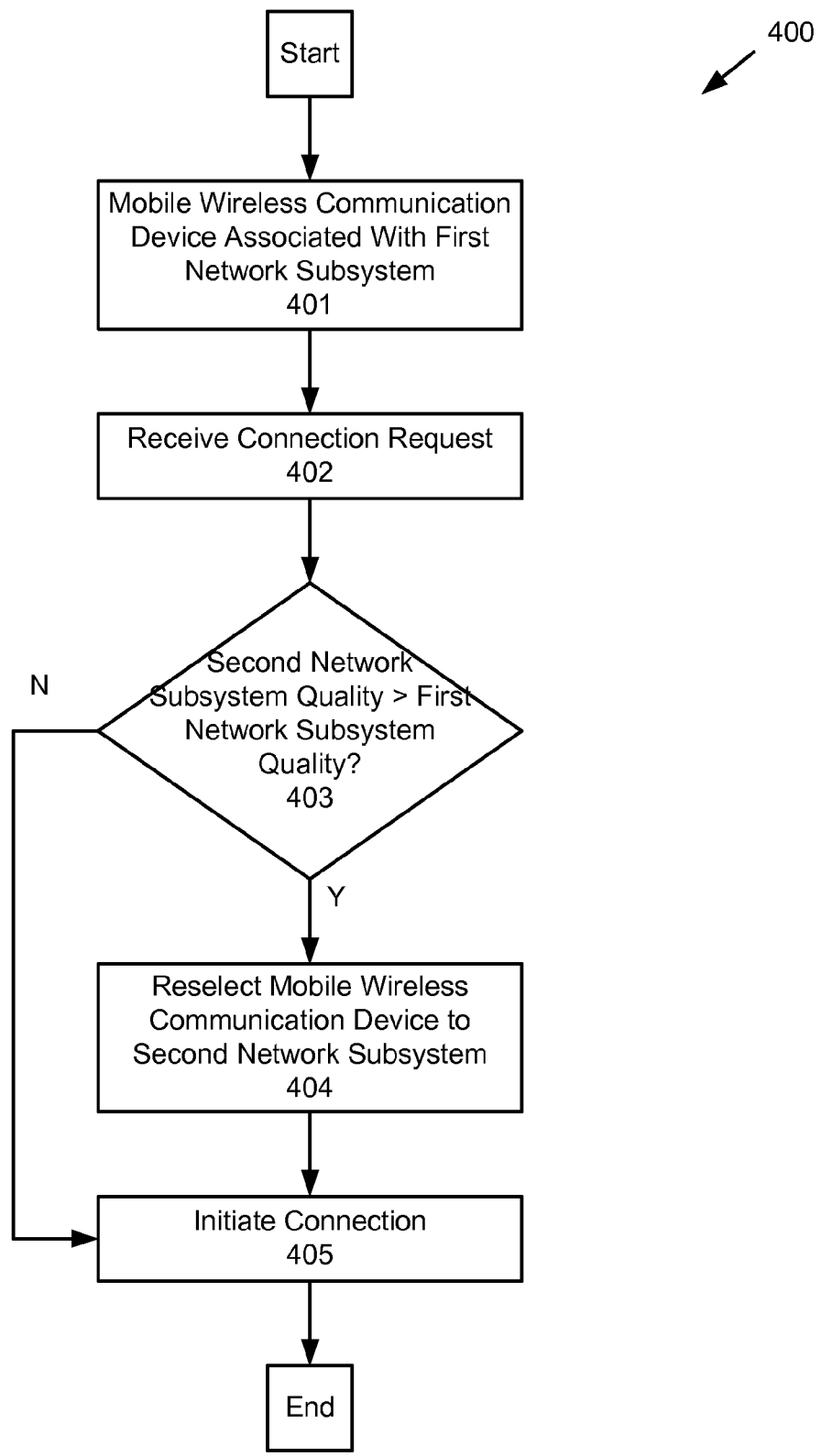
FIG. 4 illustrates a method for changing association of a mobile wireless communication device between network subsystems.

FIG. 4 illustrates an embodiment of a method for reselecting a mobile wireless communication device 101 with a wireless network subsystem, such as a BTS in a cell of a wireless communication network. In step 401, the mobile wireless communication device 101 can be associated with a first network subsystem. For example, the first network system can be a BTS in a serving cell of a wireless communication network. In step 402, the mobile wireless communication device 101 can receive a connection request. The connection request can originate from a processing block within the mobile wireless communication device 101 that controls establishing links with an external wireless communication network. In step 403, the mobile wireless communication device 101 can determine if a second network subsystem can offer a higher quality connection that the current network subsystem with which the mobile wireless communication device 101 is associated. For example, a BTS in a neighbor cell can have a higher quality currently or can be estimated to have a higher quality in the near future when a connection is completed with the mobile wireless communication device 101 compared to the BTS in the presently associated serving cell. If the current first network subsystem is best, then in step 405 the mobile wireless communication device 101 can initiate a connection with the current first network subsystem. If the current first network subsystem is not the best, then in step 404, the mobile wireless communication device 101 can first reselect to the higher quality second network subsystem to which a connection can then be initiated in step 405.

Figure 5:
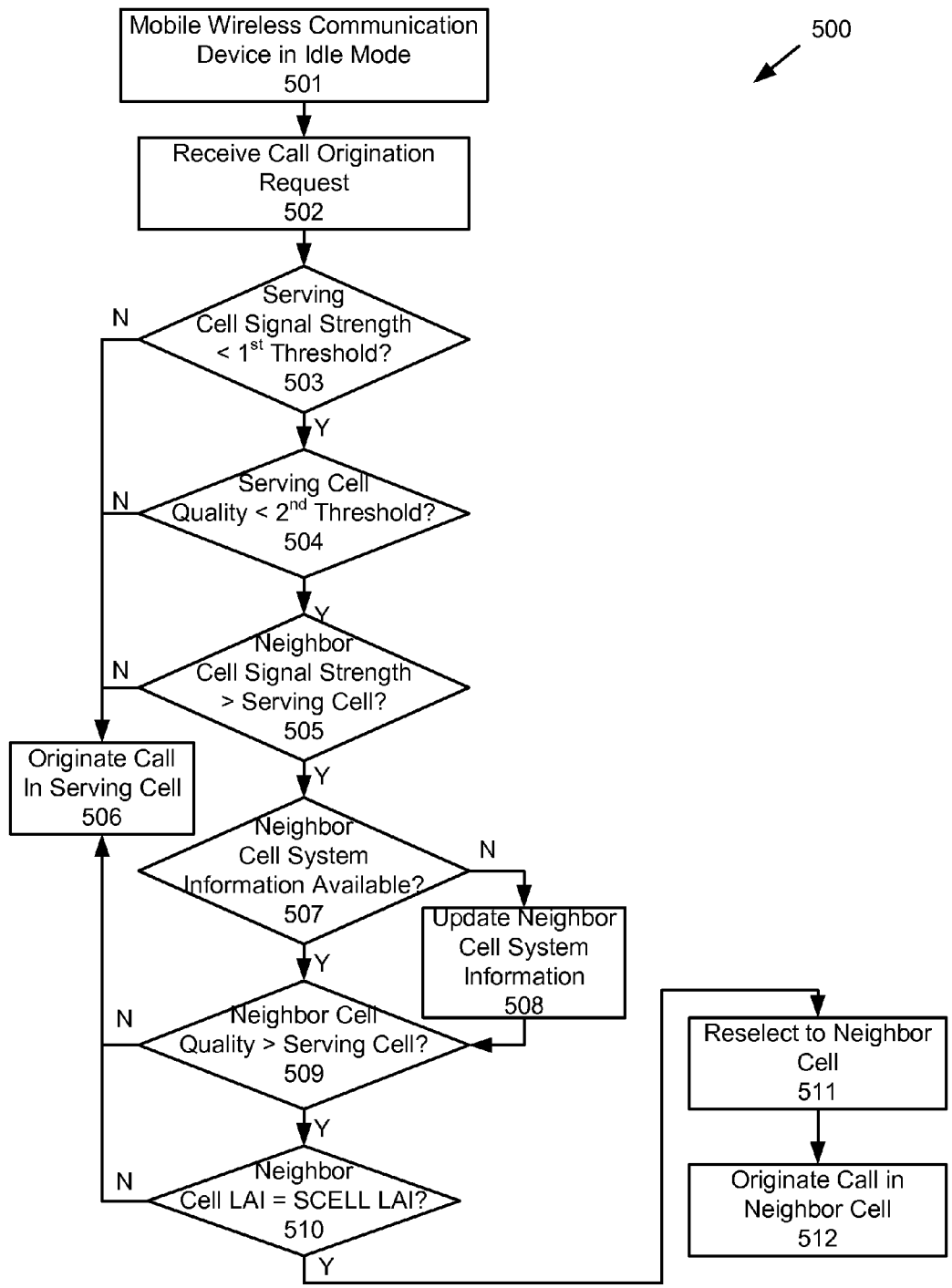
FIG. 5 illustrates a representative method for cell reselection by a mobile wireless communication device after receiving a call origination request.

FIG. 5 illustrates a more detailed, specific embodiment of a method to reselect a mobile wireless communication device 101 to one or more network subsystems in a wireless communication network. In step 501, the mobile wireless communication device 101 can be in an "idle" mode, i.e. associated with a "serving" cell's BTS in the wireless communication network but not actively connected. In step 502, the mobile wireless communication device 101 can receive a call origination request to form an active connection with the wireless communication network. The call origination request can be generated by a user of the mobile wireless communication device 101.

In step 503, the mobile wireless communication device 101 can determine if the current serving cell's signal strength falls below a first threshold, thereby detecting if the performance of a connection between the mobile wireless communication device 101 and the wireless communication network through the BTS in the serving cell can potentially prove inadequate. In an embodiment, the mobile wireless communication device 101 can determine if the receive signal strength of the serving cell falls below a first threshold. If the current serving cell's signal strength exceeds the first threshold, then in step 506, the mobile wireless communication device 101 can originate a call with the BTS in the serving cell. Otherwise, in step 504, the mobile wireless communication device 101 can determine if the current serving cell's signal quality level falls below a second threshold. While the test for signal strength in step 503 can determine if signals received from the BTS in the serving cell can be low, the interference level can also be low and the quality of a connection with the serving cell, e.g. based on a signal to interference ratio, can be adequately high for effective communication. Quality metrics such as measuring the decode success rate of FCCH and SCH frames and examining receive equalizer outputs can be analyzed in the mobile wireless communication device 101 to assess a serving cell's quality of connection. While the method outlined in FIG. 5 proceeds to testing for a neighbor cell in step 505 when both the serving cell's signal strength and quality fall below thresholds, an alternative implementation could proceed to step 505 when either the serving cell's signal strength or the serving cell quality falls below a respective threshold.

If the current serving cell's quality level exceeds the second threshold, then in step 506 the mobile wireless communication device 101 can originate a call with the BTS in the serving cell. Otherwise, in step 505, the mobile wireless communication device 101 can determine if a "better" neighbor cell, e.g. one with higher signal strength or higher quality, is available. Even if the serving cell's signal strength and quality fall below designated thresholds, in some cases. all neighbor cells can have weaker signal strengths. In this case, the mobile wireless communication device 101 can originate the call with the BTS of the serving cell in step 506. If, however, a neighbor cell has higher signal strength than the current serving cell, then the mobile wireless communication device 101 can determine if the neighbor cell can be more suitable for completing the requested call. In a representative embodiment for a GSM wireless communication network, the mobile wireless communication device 101, in step 505, can determine if a C2 timer is running for a neighbor cell. The C2 timer associated with the neighbor cell can provide an indication to the mobile wireless communication device 101 that the signal strength of the neighbor cell exceeds the signal strength of the current serving cell.

Figure 6:
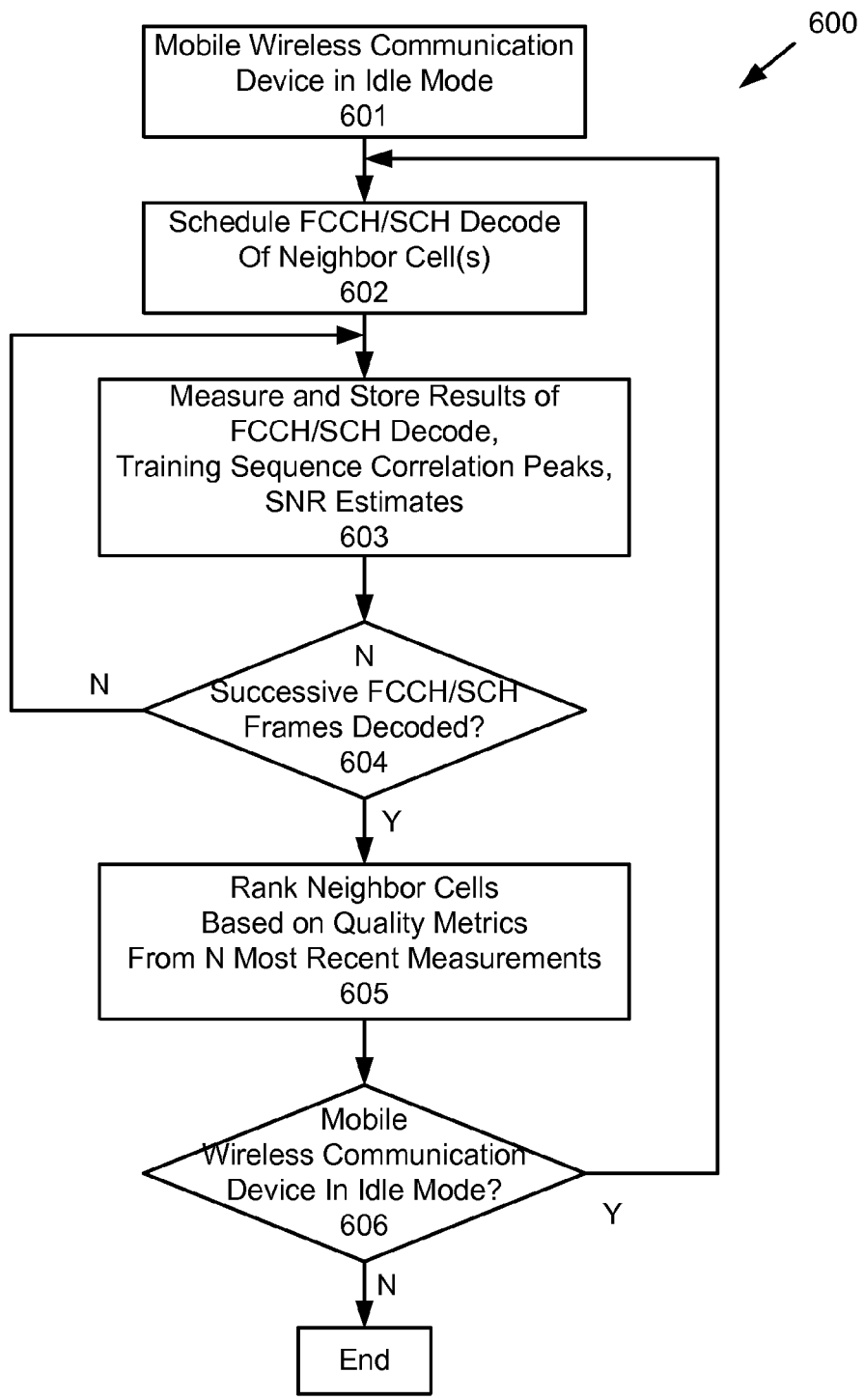
FIG. 6 illustrates a representative method for monitoring and ranking a set of cells by a mobile wireless communication device.

If a neighbor cell with higher signal strength than the current serving cell exists, then in step 507, the mobile wireless communication device 101 can determine if recent system information has been read for the neighbor cell identified in step 505. Both the serving cell and neighbor cells can be regularly monitored for one or more metrics such as a measure of signal strength, interference levels, decoding errors, equalizer outputs or other receive parameters to assess and rank the quality of connections with the different cells to which the mobile wireless communication device 101 can connect. A history of system information for the serving cell and neighbor cell can be analyzed by and stored in the mobile wireless communication device to assist with determining a cell with which to associate and connect to the wireless network. The mobile wireless communication device 101 can choose to associate with and connect to the network through a cell with more stable signal quality. FIG. 6, as discussed later, illustrates a representative embodiment of a method to monitor quality of serving and neighbor cells.

If current system information is not available for the identified "better" neighbor cell, then in step 508 the mobile wireless communication device 101 can read and update available system information for the neighbor cell. With system information available, the mobile wireless communication device 101, in step 509, can determine if the quality of a connection using the neighbor cell can exceed the quality using the current serving cell. If the quality of the neighbor cell is lower than the quality of the serving cell, then the mobile wireless communication device 101 can originate the call through the current serving cell in step 506.

If the neighbor cell's quality exceeds the current serving cell's quality, then in step 510 the mobile wireless communication device 101 can determine if the serving cell and neighbor cell have the same location area identifier (LAI). Sets of cells within a wireless communication network can be grouped together by a common LAI such as for a group of cells serving a particular geographic area. If the neighbor cell has a different location area identifier (LAI) than the serving cell, then the mobile wireless communication device 101 can originate a call in the serving cell (step 506). If the neighbor cell has the same LAI as the serving cell, then in step 511, the mobile wireless communication device can reselect to the neighbor cell. Finally, in step 512, the mobile wireless communication device 101 can originate a call in the neighbor cell (which can actually be a new serving cell after reselection in step 510).

FIG. 5 illustrates a representative embodiment; however, other embodiments can rearrange the order of some steps or skip some steps altogether. For example, the mobile wireless communication device 101 can search for a better neighbor cell if either the serving cell's signal strength or its quality falls below a relevant threshold rather than both as shown. Similarly, the mobile wireless communication device 101 can reselect to a neighbor cell if a quality of the serving cell is better than the serving cell independent of the neighbor cells signal strength level. A measure of the quality of a received signal can be more relevant than an absolute level of signal strength alone.

FIG. 6 illustrates a series of steps that the mobile wireless communication device 101 can use while in an "idle" mode to assess the quality of neighbor cells as candidates for reselection. In step 601, the mobile wireless communication device 101 can be associated with a serving cell in an "idle" mode. In step 602, the mobile wireless communication device 101 can schedule decoding of the FCCH and SCH frames for one or more neighbor cells. In step 603, evaluation of the quality of the neighbor cells can include decoding and correlation of the FCCH and SCH training sequences as well as signal to noise ratio (SNR) estimates for each neighbor cell based on outputs from a receive equalizer or from soft decoders in the mobile wireless communication device 101. In step 603, results from the evaluation of received FCCH and SCH frames for each neighbor cell can be combined with stored estimates from previously received FCCH and SCH frames from that neighbor cell to produce peak values, mean values or other "filtered" values of each of the quality metrics monitored. Step 603 can be repeated until N successive FCCH and SCH frames have been decoded as tested in step 604. In step 605, after decoding and evaluating N successive FCCH and SCH frames for each of the neighbor cells, the mobile wireless communication device 101 can rank the monitored neighbor cells based on the N most recent measurements. If the mobile wireless communication device 101 continues in idle mode, then the scheduling, measurement, combining and storing of quality metrics, as well as the ranking of the neighbor cells in steps 602 to 605 can be repeated at regular intervals as indicated by step 606.

The following table lists a hypothetical set of monitored quality values for a serving cell and several neighbor cells in a wireless communication network. This table can illustrate representative embodiments of the methods shown in FIGS. 5 and 6.

| | SCELL | | NCELL 1 | | NCELL 2 | | NCELL 3 | |
|---|---|---|---|---|---|---|---|---|
| | RSSI | SNR | RSSI | SNR | RSSI | SNR | RSSI | SNR |
| T0 | −90 | 6 | −96 | 8 | −100 | 8 | −105 | 4 |
| T1 | −95 | 5 | −93 | 9 | −100 | 8 | −105 | 4 |
| T2 | −97 | 4 | −90 | 9 | −94 | 8 | −105 | 4 |
| T3 | −100 | 2 | −87 | 10 | −94 | 8 | −105 | 4 |

At time T0, a mobile wireless communication device 101 can be associated with a serving cell (SCELL) having a receive signal strength indicator (RSSI) of −90 dBm and a receive signal quality measure (SNR) of 6 dB. Each of three neighbor cells (NCELL1, NCELL2 and NCELL 3) can have lower values of receive signal strength than the serving cell as indicated. The mobile wireless communication device 101 can require a minimum receive signal strength of at least −95 dBm for the first threshold in step 503 of FIG. 5. If a call origination request occurs at time T0, then the mobile wireless communication device 101 can originate the call in the serving cell as the current serving cell's signal strength suffices. At time T1, the receive signal strength in the serving cell can have degraded to −95 dBm (just at the minimum required) while the neighbor NCELL 1 at −93 dBm can exceed the serving cell in receive signal strength measured at the mobile wireless communication device 101. If a call origination request occurs at time T1, then the mobile wireless communication device 101 can still originate the call in the serving cell, even though the neighbor cell's signal strength is higher, as the serving cell's signal strength still suffices based on the first threshold level setting. Thus setting a level for the first threshold in step 503 can determine when a neighbor cell can be considered for reselection.

At time T2, the receive signal strength of the serving cell can have degraded to −97 dBm, below the first threshold of −95 dBm, while signals received from neighbor cells NCELL 1 and NCELL 2 at −90 dBm and −94 dBm respectively can both exceed the serving cell's receive signal strength. A call origination request at time T2 can still result in the mobile wireless communication device 101 originating a call in the serving cell, however, if the serving cell's quality in step 504 suffices. For example, if the second threshold for serving cell's quality is set to 3 dB, then an SNR of 4 dB at time T2 can still indicate that the serving cell can be used. At time T3, the receive signal strength of the serving cell can continue to degrade to −100 dBm and the receive SNR can fall to 2 dB, below the second threshold of 3 dB for serving cell quality. If a call origination request occurs at time T3, then the mobile wireless communication device 101 can evaluate stored and filtered quality metrics from the neighbor cells NCELL 1 and NCELL 2 to determine which neighbor cell can provide a higher quality connection as outlined in FIGS. 5 and 6.

Figure 7:
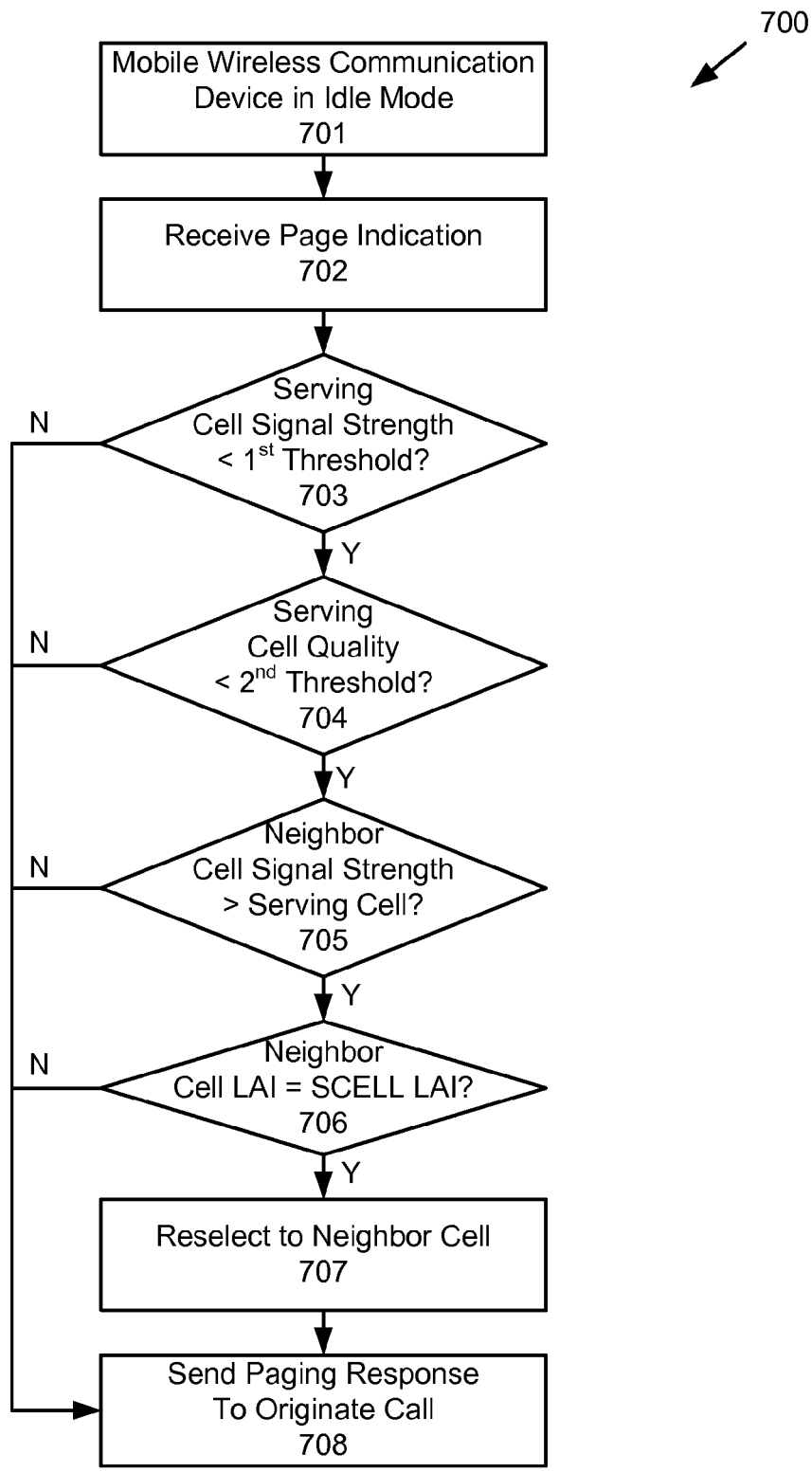
FIG. 7 illustrates a representative method for cell reselection by a mobile wireless communication device after receiving a paging request.

FIG. 7 illustrates a method for cell reselection by the mobile wireless communication device 101 when the wireless communication network initiates a connection. In step 701, the mobile wireless communication device 101 can be in an "idle" mode, i.e. associated with but not actively connected to a BTS in a serving cell. In step 702, the mobile wireless communication device 101 can receive a page indication from the wireless communication network. Any of several BTS, each located in a different cell and sharing a common LAI, can transmit the page indication. In step 703, the mobile wireless communication device 101 can determine if the received signal strength of the serving cell with which it is associated falls below a first threshold. If the received signal strength of the serving cell does not fall below the first threshold, then the mobile wireless communication device 101 can send a paging response to the BTS in the serving cell to originate a call, as shown in step 708. If the serving cell's signal strength falls below the first threshold, then in step 704, the mobile wireless communication device 101 can determine if the serving cell's quality falls below a second threshold. If the quality threshold is met, then the serving cell can be used for call origination. If the quality threshold is not met, then the mobile wireless communication device can determine if a neighbor cell has signal strength greater than the current serving cell, as indicated in step 705. If all neighbor cells have signal strengths less than the current serving cell, then a paging response can be sent in the current serving cell. If, however, one or more of the neighbor cells have higher signal strengths higher than the current serving cell, then the mobile wireless communication device can determine if the neighbor cell's LAI is the same as for the serving cell. If the neighbor cell has the same LAI as indicated in step 706, then the mobile wireless communication device 101 can reselect in step 707 to the neighbor cell. In step 708, a paging response can be sent to the reselected neighbor cell (which can now be the serving cell after reselection in step 707).

Software, hardware, or a combination of hardware and software can implement various aspects of the described embodiments. The described embodiments can also be encoded as computer program code and/or instructions on a non-transitory computer-readable medium. The non-transitory computer-readable medium is any data storage device that can store data that can thereafter be read by a computer system. Examples of the non-transitory computer-readable medium include read-only memory, random-access memory, CD-ROMs, DVDs, magnetic tape and optical data storage devices. The computer program code and/or instructions can also be distributed over network-coupled computer systems so that the computer program code and/or instructions are stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for cell reselection by a mobile user equipment (UE), the method comprising:
    after receiving a call origination request and before originating a call via a wireless network in response to the call origination request:
        obtaining a set of serving cell performance metrics for a serving cell associated with the mobile UE;
        comparing the set of serving cell performance metrics for the serving cell to a set of corresponding performance thresholds;
        when the set of serving cell performance metrics does not satisfy the set of corresponding performance thresholds, obtaining a set of neighboring cell performance metrics for a neighboring cell;
        determining whether the neighboring cell is suitable for cell reselection based on the set of serving cell performance metrics and the set of neighboring cell performance metrics; and
        reselecting from the serving cell to the neighboring cell when the neighboring cell is suitable for cell reselection.

2. The method of claim 1, wherein:
    the set of serving cell performance metrics comprises one or more of a serving cell received signal strength and a serving cell received signal quality,
    the set of neighboring cell performance metrics comprises one or more of a neighboring cell received signal strength and a neighboring cell received signal quality, and
    the set of performance thresholds comprises one or more of a received signal strength threshold and a received signal quality threshold.

3. The method of claim 2, wherein determining whether the neighboring cell is suitable for cell reselection comprises:
    comparing the neighboring cell received signal quality with the serving cell received signal quality;
    determining whether a serving cell location area identifier (LAI) and a neighboring cell LAI are identical, when the neighboring cell received signal quality exceeds the serving cell received signal quality; and reselecting from the serving cell to the neighboring cell to originate the call when the serving cell LAI and the neighboring cell LAI are identical and the neighboring cell received signal quality exceeds the serving cell received signal quality.

4. The method of claim 3, further comprising:
originating the call on the serving cell when the serving cell LAI differs from the neighboring cell LAI.

5. The method of claim 2, wherein determining whether the neighboring cell is suitable for cell reselection comprises:
comparing the neighboring cell received signal strength to the received signal strength threshold; and
reselecting from the serving cell to the neighboring cell before originating the call when the neighboring cell received signal strength exceeds the serving cell received signal strength.

6. The method of claim 2, wherein the set of serving cell performance metrics does not satisfy the set of corresponding performance thresholds when one or more of:
the serving cell received signal strength is less than the received signal strength threshold, and
the serving cell received signal quality is less than the received signal quality threshold.

7. The method of claim 1, wherein determining whether the neighboring cell is suitable for cell reselection comprises:
determining whether a cell reselection timer associated with the neighboring cell is running; and
when the cell reselection timer for the neighboring cell is running, reselecting from the serving cell to the neighboring cell.

8. The method of claim 1, wherein the mobile UE receives the call origination request based on a user input to the mobile UE or based on a page indication from the serving cell to the mobile UE.

9. The method of claim 1, wherein the set of serving cell performance metrics comprises one or more of:
an interference level determined based on one or more correlations of received signals with known data patterns,
a decoding error metric, and signal-to-noise ratio (SNR) estimates based on equalizer outputs.

10. The method of claim 1, wherein the neighboring cell performance metric comprises one or more of:
decoding and correlation of a frequency correction channel (FCCH) training sequence,
decoding and correlation of a synchronization channel (SCH) training sequence, and
signal-to-noise ratio (SNR) estimates based on equalizer outputs.

11. The method of claim 1, wherein:
the set of serving cell performance metrics comprises a predicted serving cell performance metric,
the set of neighboring cell performance metrics comprises a predicted neighboring cell performance metric, and
the comparing, determining, and reselecting steps are based on the predicted serving cell performance metric and the predicted neighboring cell performance metric.

12. A mobile user equipment (UE) comprising:
at least one transceiver configurable to communicate with a serving cell and a neighboring cell; and
one or more processors coupled to the at least one transceiver and configured to execute instructions, that when executed, cause the mobile UE to:
after receiving a call origination request and before originating a call via a wireless network in response to the call origination request:
obtain a set of serving cell performance metrics for the serving cell;
compare the set of serving cell performance metrics for the serving cell to a set of corresponding performance thresholds;
when the set of serving cell performance metrics does not satisfy the set of corresponding performance thresholds, obtain a set of neighboring cell performance metrics for the neighboring cell;
determine whether the neighboring cell is suitable for cell reselection based on the set of serving cell performance metrics and the set of neighboring cell performance metrics; and
reselect from the serving cell to the neighboring cell when the neighboring cell is suitable for cell reselection.

13. The mobile UE of claim 12, wherein
the set of serving cell performance metrics comprises one or more of a serving cell received signal strength and a serving cell received signal quality,
the set of neighboring cell performance metrics comprises one or more of a neighboring cell received signal strength and a neighboring cell received signal quality, and
the set of performance thresholds comprises one or more of a received signal strength threshold and a received signal quality threshold.

14. The mobile UE of claim 13, wherein execution of the instructions causes the mobile UE to:
determine whether the neighboring cell is suitable for cell reselection by:
comparing the neighboring cell received signal quality with the serving cell received signal quality;
determining whether a serving cell location area identifier (LAI) and a neighboring cell LAI are identical, when the neighboring cell received signal quality exceeds the serving cell received signal quality; and
reselect from the serving cell to the neighboring cell to originate the call when the serving cell LAI and the neighboring cell LAI are identical and the neighboring cell received signal quality exceeds the serving cell received signal quality.

15. The mobile UE of claim 14, wherein execution of the instructions further causes the mobile UE to originate the call on the serving cell when the serving cell LAI differs from the neighboring cell LAI.

16. The mobile UE of claim 12, wherein the call origination request is received based on a user input to the mobile UE or based on a page indication from the serving cell to the mobile UE.

17. The mobile UE of claim 12, wherein:
the set of serving cell performance metrics comprises a predicted serving cell performance metric,
the set of neighboring cell performance metrics comprises a predicted neighboring cell performance metric, and
execution of the instructions causes the mobile UE to determine whether to reselect from the serving cell to the neighboring cell based on the predicted serving cell performance metric and the predicted neighboring cell performance metric.

18. A non-transitory computer-readable storage medium configured to store instructions that, when executed by one or more processors in a mobile user equipment (UE), cause the mobile UE to perform a cell reselection method by carrying out steps that include:

after receiving a call origination request and before originating a call via a wireless network in response to the call origination request:

obtaining a set of serving cell performance metrics for a serving cell associated with the mobile UE;

comparing the set of serving cell performance metrics for the serving cell to a set of corresponding performance thresholds;

when the set of serving cell performance metrics does not satisfy the set of corresponding performance thresholds, obtaining a set of neighboring cell performance metrics for a neighboring cell;

determining whether the neighboring cell is suitable for cell reselection based on the set of serving cell performance metrics and the set of neighboring cell performance metrics; and reselecting from the serving cell to the neighboring cell when the neighboring cell is suitable for cell reselection.

19. The non-transitory computer-readable storage medium of claim 18, wherein determining whether the neighboring cell is suitable for cell reselection comprises:

comparing a neighboring cell received signal quality with a serving cell received signal quality;

determining whether a serving cell location area identifier (LAI) and a neighboring cell LAI are identical, when the neighboring cell received signal quality exceeds the serving cell received signal quality; and reselecting from the serving cell to the neighboring cell to originate the call when the serving cell LAI and the neighboring cell LAI are identical and the neighboring cell received signal quality exceeds the serving cell received signal quality.

20. The non-transitory computer-readable storage medium of claim 18, wherein:

the set of serving cell performance metrics comprises a predicted serving cell performance metric, the set of neighboring cell performance metrics comprises a predicted neighboring cell performance metric, and the mobile UE determines whether to reselect from the serving cell to the neighboring cell based on the predicted serving cell performance metric and the predicted neighboring cell performance metric.

21. An apparatus configurable for operation in a mobile user equipment (UE), the apparatus comprising:

one or more processors storing instructions that, when executed by the one or more processors, cause the mobile UE to:

after receiving a call origination request and before originating a call via a wireless network in response to the call origination request:

obtain a set of serving cell performance metrics for a serving cell;

compare the set of serving cell performance metrics for the serving cell to a set of corresponding performance thresholds;

when the set of serving cell performance metrics does not satisfy the set of corresponding performance thresholds, obtain a set of neighboring cell performance metrics for a neighboring cell;

determine whether the neighboring cell is suitable for cell reselection based on the set of serving cell performance metrics and the set of neighboring cell performance metrics; and reselect from the serving cell to the neighboring cell when the neighboring cell is suitable for cell reselection.

22. The apparatus of claim 21, wherein the set of serving cell performance metrics comprises one or more of a serving cell received signal strength and a serving cell received signal quality, the set of neighboring cell performance metrics comprises one or more of a neighboring cell received signal strength and a neighboring cell received signal quality, and the set of performance thresholds comprises one or more of a received signal strength threshold and a received signal quality threshold.

23. The apparatus of claim 22, wherein execution of the instructions causes the mobile UE to:

determine whether the neighboring cell is suitable for cell reselection by:

comparing the neighboring cell received signal quality with the serving cell received signal quality;

determining whether a serving cell location area identifier (LAI) and a neighboring cell LAI are identical, when the neighboring cell received signal quality exceeds the serving cell received signal quality; and reselect from the serving cell to the neighboring cell to originate the call when the serving cell LAI and the neighboring cell LAI are identical and the neighboring cell received signal quality exceeds the serving cell received signal quality.

24. The apparatus of claim 23, wherein execution of the instructions further causes the mobile UE to originate the call on the serving cell when the serving cell LAI differs from the neighboring cell LAI.

25. The apparatus of claim 21, wherein the call origination request is received based on a user input to the mobile UE or based on a page indication from the serving cell to the mobile UE.

26. The apparatus of claim 21, wherein:

the set of serving cell performance metrics comprises a predicted serving cell performance metric, the set of neighboring cell performance metrics comprises a predicted neighboring cell performance metric, and execution of the instructions causes the mobile UE to determine whether to reselect from the serving cell to the neighboring cell based on the predicted serving cell performance metric and the predicted neighboring cell performance metric.

* * * * *